(12) United States Patent
Krause

(10) Patent No.: US 12,410,886 B1
(45) Date of Patent: Sep. 9, 2025

(54) CHAIN LUBRICANT APPLICATOR APPARATUS

(71) Applicant: Henry J Krause, Hauppauge, NY (US)

(72) Inventor: Henry J Krause, Hauppauge, NY (US)

( * ) Notice: Subject to any disclaimer, the term of this patent is extended or adjusted under 35 U.S.C. 154(b) by 0 days.

(21) Appl. No.: 18/391,034

(22) Filed: Dec. 20, 2023

Related U.S. Application Data

(60) Provisional application No. 63/434,651, filed on Dec. 22, 2022.

(51) Int. Cl.
*B05C 1/06* (2006.01)
*F16N 3/02* (2006.01)

(52) U.S. Cl.
CPC .................. *F16N 3/02* (2013.01); *B05C 1/06* (2013.01); *F16N 2210/33* (2013.01)

(58) Field of Classification Search
CPC .......... F16N 3/02; F16N 2210/33; B05C 1/06
See application file for complete search history.

(56) References Cited

U.S. PATENT DOCUMENTS

| | | | | |
|---|---|---|---|---|
| 2,355,003 A * | 8/1944 | Mccann | ................... | F16H 57/05 474/111 |
| 2,813,599 A * | 11/1957 | Amberg | ................... | B62J 31/00 474/91 |
| 3,089,626 A * | 5/1963 | Kubiliunas | .......... | B65D 47/305 222/536 |
| 5,020,637 A * | 6/1991 | Hoenselaar | .......... | B65D 83/303 401/190 |
| 5,213,180 A * | 5/1993 | Masonek | ................ | F16H 57/05 184/15.3 |
| 5,360,084 A * | 11/1994 | Graf | ........................ | B61K 3/02 184/15.3 |
| 5,386,882 A * | 2/1995 | Friend | ................... | B66B 7/1284 184/15.3 |
| 5,484,038 A * | 1/1996 | Rowell | .................... | B62J 31/00 280/288.4 |
| 5,597,255 A * | 1/1997 | Yager | .................. | A61M 35/006 401/207 |
| 8,757,325 B2 * | 6/2014 | Singer | ...................... | B05C 1/04 184/11.5 |
| 9,079,720 B1 * | 7/2015 | Schmidt | .................. | F16H 57/05 |
| 10,052,656 B2 * | 8/2018 | Maslennikov | ......... | A46B 11/06 |
| 10,906,749 B2 * | 2/2021 | Kordes | ................... | B65G 45/08 |
| 11,852,234 B1 * | 12/2023 | Marrero | ................... | F16N 3/00 |
| 2009/0223745 A1 * | 9/2009 | Marcucci | .................. | F16N 7/32 222/395 |
| 2014/0060973 A1 * | 3/2014 | Singer | ...................... | B05C 1/04 184/15.1 |
| 2014/0241782 A1 * | 8/2014 | Singer | ...................... | B05C 1/04 401/143 |
| 2018/0162653 A1 * | 6/2018 | Kordes | ................... | F16N 9/00 |
| 2024/0003488 A1 * | 1/2024 | Hodson | .................... | F16N 3/06 |

\* cited by examiner

Primary Examiner — Michael A Riegelman
(74) Attorney, Agent, or Firm — Larry D. Johnson

(57) ABSTRACT

A chain lubricant applicator apparatus attaches to a container of lubricant. Three wicking pads define a channel for passage of a chain to be lubricated, and apply lubricant to the chain rollers and side plates of the chain. The side wicking pads may be retained in place by a retaining feature such as small serrations or teeth. A valve in the housing regulates lubricant flow from the lubricant container to the wicking pads.

11 Claims, 4 Drawing Sheets

CHAIN LUBRICANT APPLICATOR APPARATUS

CROSS REFERENCE TO RELATED APPLICATIONS

The present application claims the benefit of the filing date of U.S. Provisional Patent Application Ser. No. 63/434,651, filed Dec. 22, 2022. The foregoing application is incorporated by reference in its entirety as if fully set forth herein.

TECHNICAL FIELD

This written description relates generally to lubricants and lubricant applicators, and more particularly to an improved lubricant applicator for use with chains, and in particular bicycle chains.

BACKGROUND

Chains, and in particular bicycle chains, are often difficult to lubricate and do not have a generally accepted way or method of being lubricated.

SUMMARY

Described below is a chain lubricant applicator apparatus that enables a user to accurately and quickly lubricate a chain, and in particular a bicycle chain. In some implementations, the chain lubricant applicator attaches to a container of lubricant.

In some implementations, the lubricant applicator uses three wicking pads. In some implementations, the wicking pads are replaceable, and may be replaced by simply pulling them out from side and bottom panels of the applicator and inserting replacement wicking pads.

In some implementations, a bottom wicking pad applies lubricant from the top (when the applicator is inverted during use) on to the chain rollers. In some implementations, a second wicking pad is located on the right side of the applicator, and a third on the left side. In some implementations, the flow of lubricant is initially to the bottom pad, and the lubricant then may work its way onto the side pads via both the action of the chain passing through the pads, and/or from wicking from the bottom pad once it has been saturated with lubricant. In some implementations, these side pads lubricate the side plates of the chain, and also clean the side plates of the chain, which may be prone to attract abrasive contaminants. This cleaning function can be important for the long term precise performance of the chain.

In some implementations, the side wicking pads may be retained in place on the applicator side panels by a retaining feature such as small serrations or teeth molded or otherwise incorporated into the side panels that grab and hold the side wicking pads in place. In some implementations, when adding new pads, the bottom pad is inserted first and is held in place by the side pads, which in turn are held in place by the retaining feature. In some implementations, a retaining feature such as serrations or teeth may be incorporated into other portions of the applicator to releasably capture one or more of the wicking pads.

In some implementations, the wicking pads can be cleaned and reused when appropriate or necessary, and may be good for numerous (e.g., 10 or more) applications of lubricant to a chain.

In some implementations, the applicator includes a flow control valve or dial that allows the user to moderate how much lubricant is being dispensed from the container to the wicking pads. In some implementations, this valve can be turned to an off or closed position, thus allowing the user to safely transport the container and prevent evaporation of lubricant out of the container.

In some implementations, the applicator attaches via threads or other connection mechanism to unique bottles or containers of lubricant. In some implementations, the containers may have a precision dispensing tip built into the container. In some implementations, a threaded on-off attachment allows the applicator to be taken off the container, at which time the container can then be used for other purposes with its integrated precision dispensing tip. As such, it can then be used to lubricate other components such as cables, brake and shifter pivots, derailleur springs, and other bicycle components or other components.

In some implementations, the applicator has a cap which is kept in place with a friction fit connection to the applicator, and not by any physical connection to the container.

Particular embodiments of the subject matter described in this specification can be implemented so as to realize one or more of the following advantages.

In some implementations, the applicator enables the user to lubricate a chain such as a bicycle chain without making a mess or missing any of the chain links.

In some implementations, use of the applicator avoids wasting lubricant.

In some implementations, use of the applicator avoids the risk of accidentally getting lubricant on braking or other surfaces.

In some implementations, the applicator can be scaled to any size, such as large versions that would work on industrial chains.

The details of one or more embodiments of the subject matter described in this specification are set forth in the accompanying drawings and the description above. Other features, aspects, and advantages of the subject matter will become apparent from the description, the drawings, and the claims.

Those skilled in the art will appreciate that the conception upon which this disclosure is based readily may be utilized as a basis for the designing of other structures, methods and systems that include one or more of the various features described herein.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

DETAILED DESCRIPTION

Figure 1:
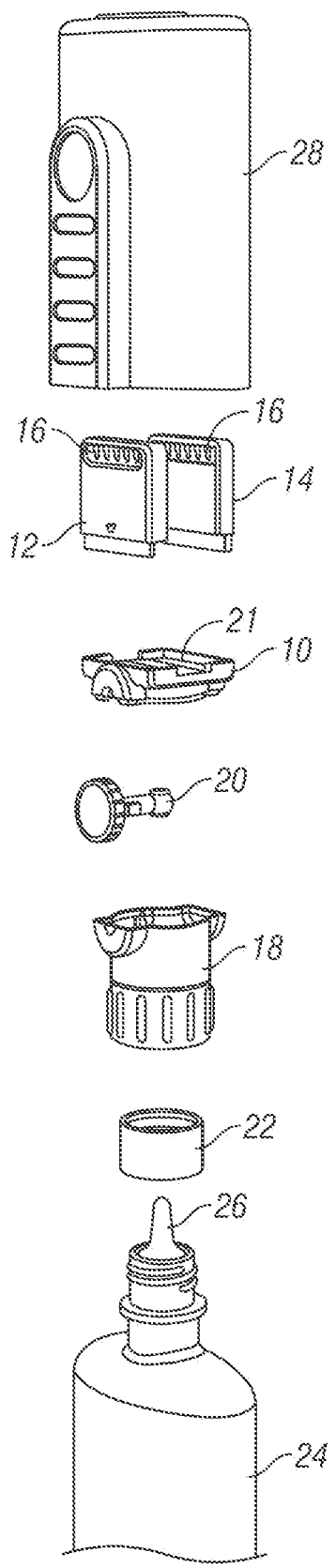
FIG. 1 is an exploded view of components of one implementation of a chain lubricant applicator.

Referring to FIGS. 1 through 4, wherein like reference numerals refer to like components in the various views, there are illustrated therein implementations of a chain lubricant applicator apparatus.

FIG. 1 is an exploded view of components of one implementation of a chain lubricant applicator, including bottom pad holder 10 and applicator side panels forming right and left pad holders 12, 14, each of which may include a pad retainer feature such as serrated teeth 16 as on an upper edge thereof to releasably secure lubricant wicking pads (not illustrated in this view) therein. Housing 18 may incorporate a valve such as ball valve 20 to regulate lubricant flow through orifice 21 in the bottom pad holder 10. Collar 22 enables releasable connection to a separate lubricant container 24, which may itself include a dispensing tip 26. Cap 28 may be designed for releasable connection to the housing 18.

Figure 2:
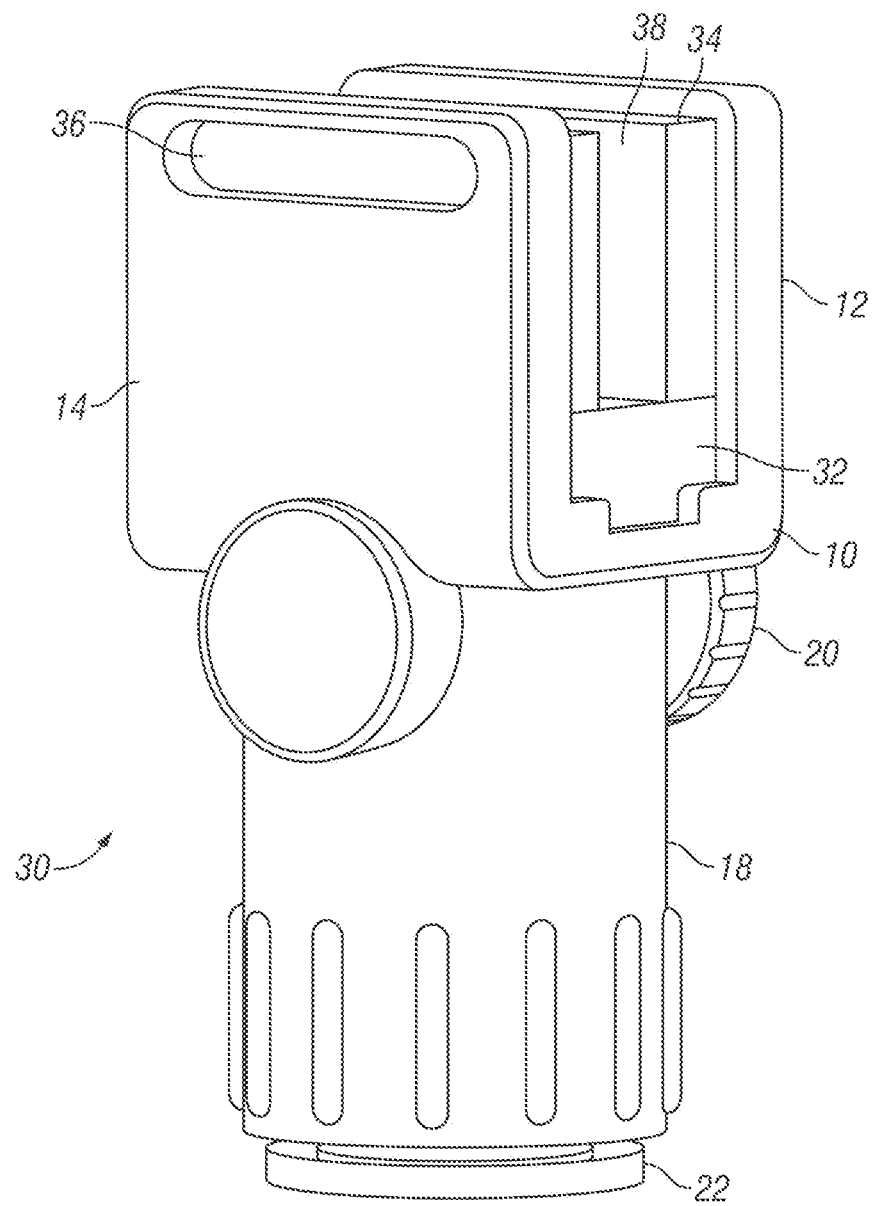
FIG. 2 is a rear perspective view of one implementation of an assembled chain lubricant applicator.

FIG. 2 is a rear perspective view of one implementation of an assembled chain lubricant applicator 30. Bottom wicking pad 32 is held in bottom pad holder 10; while right side wicking pad 34 and left side wicking pad 36 are held in right side pad holder 12 and left side pad holder 14, respectively. When installed, bottom wicking pad 32, right side wicking pad 34, and left side wicking pad 36 form a channel 38 for passage of a chain to be lubricated.

In some implementations, the side pads remove surface grit and grime off the side plates of the chain, thus preventing premature wear, and/or interference with shifting the chain from one gear to the next. In some implementations, the side pads also deposit a modest coating of lubricant on the side plates of the chain, as side plates of a chain typically only need a small amount of lubricant. In some implementations, the bottom wicking pad applies a more robust coating of lubricant to the chain rollers, as rollers require more lubricant than the side plates.

Figure 3:
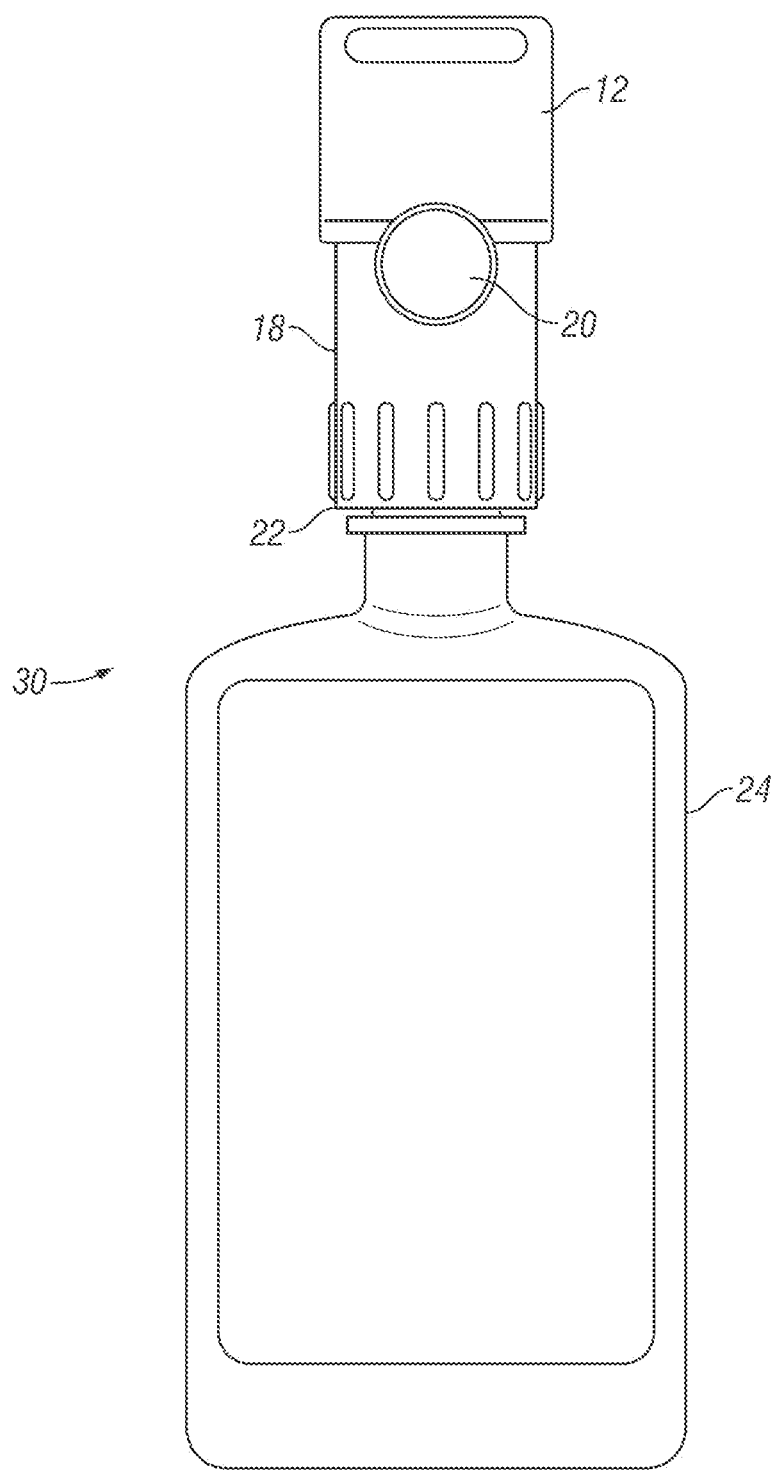
FIG. 3 is a front elevation view of one implementation of a chain lubricant applicator as attached to a container of lubricant.

FIG. 3 is a front elevation view of one implementation of a chain lubricant applicator 30 as attached to a lubricant container 24. In some implementations, the applicator integrates with a container of lubricant in a purposeful and strategic way. For example, in some implementations the lubricant is passed from the container on to the bottom wicking pad only. From the bottom pad, only about 15-20% of the lubricant may then migrate evenly to the left and right wicking pads that touch the side plates of the chain. This ensures that the side plates are not over lubricated and that the rollers and bushing inside the rollers receive an appropriate amount of lubricant.

In some implementations, a benefit of the applicator is that it may integrate seamlessly onto an existing container, inclusive of the precision dispensing tip that may come with that container. This allows the user to take the applicator off the container, and use the container and tip in the traditional way, which includes of course lubricating a chain, but also lubricating precision pivots in, for example, derailleurs, brakes, cables, clipless pedals, etc. Other chain lubrication methods may require the user to first dispense their lubricant into a separate dedicated chain lubrication container, which can then only be used to lubricate a chain.

Figure 4:
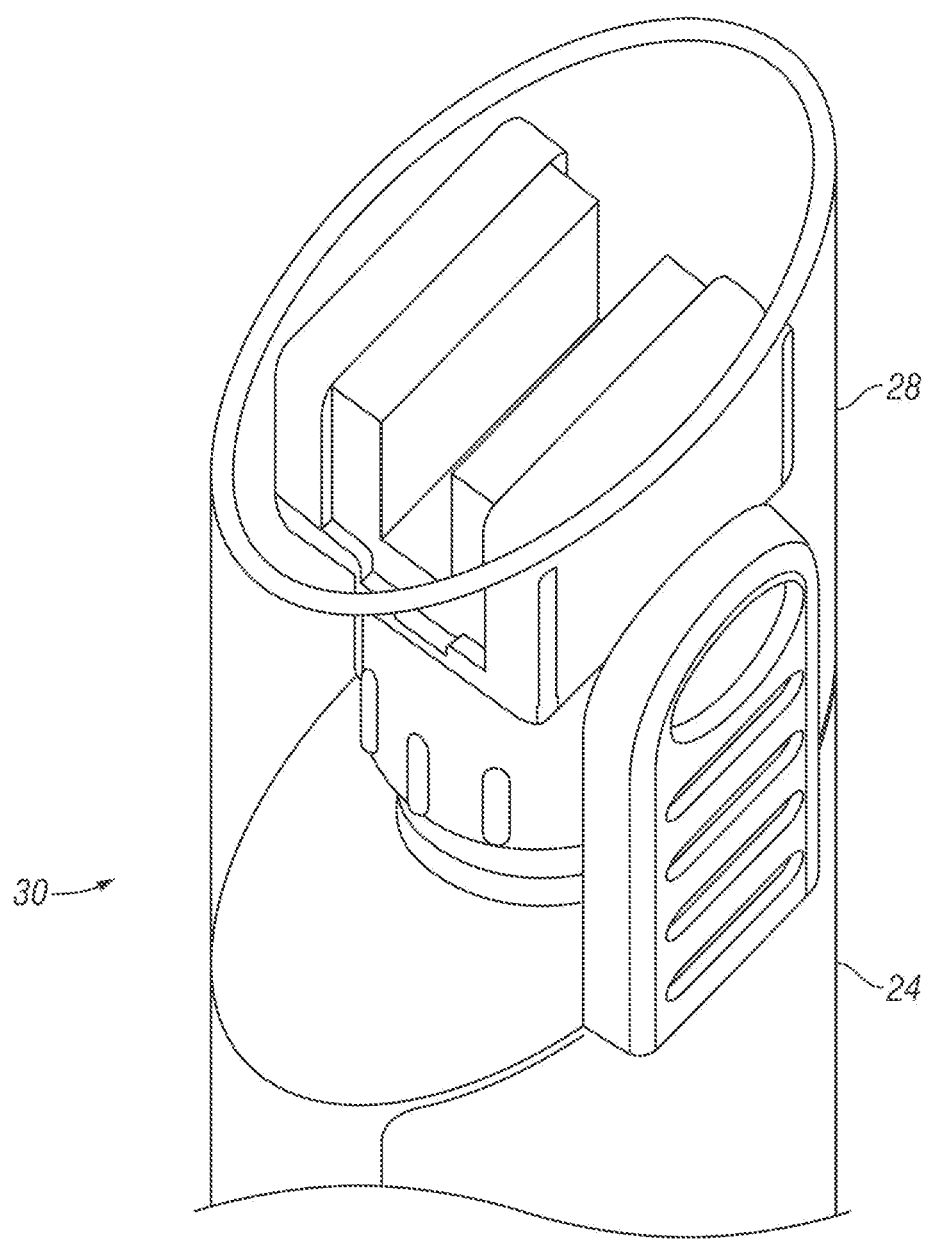
FIG. 4 is a front perspective view of one implementation of a chain lubricant applicator as attached to a container of lubricant and covered by a removable cap.

FIG. 4 is a front perspective view of one implementation of a chain lubricant applicator 30 as attached to a lubricant container 24 and covered by a removable over cap 28. In some implementations, cap 28 provides several benefits. For example, the wicking pads will retain some residual lubricant after every use, and as such they can be a magnet for attracting grit and grime. These pads need to be kept clean and away from dust, dirt and other debris that typically reside in workshops and garages, and the over cap accomplishes this task. In some implementations, the over cap 28 may include internal rails that may hold one or more replacement wicking pads (for example, both side pads and the bottom pad are preferably made of the same material and are the same universal size). In some implementations, the over cap 28 may be designed with touch points that create a friction fit over the irregularly shaped applicator, and this friction fit prevents it from accidentally falling off.

The applicator may be constructed from any appropriate material, and in the example implementation is constructed of plastic, with replaceable wicking pads. Other materials may also be used.

Benefits of using implementations of the lubricant applicator apparatus may include but are not limited to:

In some implementations, the applicator lubricates all four sides of the chain. For example the user may attach it to the chain as it passes over the chain stay (this touches the upper side of the roller plus the side plates of the chain), and then reattach it to the chain as it passes under the chain stay (this touches what was the under side of the roller plus the side plates). In doing so, the applicator lubricates the chain without missing any links. Other chain lubrication methods that squirt on, drip on, or spray on lubricant often result in missed links.

In some implementations, the applicator lubricates the chain without making a mess. Other chain lubrication methods that squirt on, drip on, or spray on lubricant often result in the lubricant getting on to rims, braking surfaces, frames, gears, the ground, and the person performing the lubrication.

In some implementations, the applicator allows the task of lubricating the chain to be accomplished in the shortest possible amount of time. Other chain lubrication methods take longer because of the need to be precise and/or the need to clean up a mess.

In some implementations, and because of the effectiveness of the applicator and its ease of use, people are no longer dissuaded from performing this critical chain lubrication maintenance task, resulting in the chain performing better and lasting longer.

Accordingly, the chain lubricant applicator apparatus may be characterized as a housing carrying a bottom wicking pad, right side wicking pad, and left side wicking pad, together defining a channel for passage of a chain to be lubricated; a collar on the housing for releasable connection to a lubricant container; and a valve in the housing to regulate lubricant flow to the bottom wicking pad. In some implementations, the bottom wicking pad is held in a bottom pad holder bearing an orifice for passage of lubricant. In some implementations, the right side wicking pad is held in a right side pad holder, and the left side wicking pad is held in a left side pad holder. In some implementations, the right side pad holder and the left side pad holder each bear a retainer feature to releasably secure a lubricant wicking pad. In some implementations, the retainer feature comprises serrated teeth. In some implementations, the bottom wicking pad is held in place by the right side wicking pad and left side wicking pad. In some implementations, the apparatus includes a cap for releasable connection to the housing.

Alternatively, the chain lubricant applicator apparatus may be characterized as a lubricant container; a housing releasably connected to the lubricant container, the housing carrying a bottom wicking pad, right side wicking pad, and left side wicking pad, together defining a channel for passage of a chain to be lubricated; and a valve in the housing to regulate lubricant flow from the lubricant container to the bottom wicking pad. In some implementations, the bottom wicking pad is held in a bottom pad holder bearing an orifice for passage of lubricant. In some implementations, the right side wicking pad is held in a right side pad holder, and the left side wicking pad is held in a left side pad holder. In some implementations, the right side pad holder and the left side pad holder each bear a retainer feature to releasably secure a lubricant wicking pad. In some implementations, the retainer feature comprises serrated teeth. In some implementations, the bottom wicking pad is held in place by the right side wicking pad and left side wicking pad. In some implementations, the apparatus includes a cap for releasable connection to the housing. In some implementations, the lubricant container includes a dispensing tip.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A chain lubricant applicator apparatus comprising:
    a housing carrying a bottom wicking pad, right side wicking pad, and left side wicking pad, together defining a channel for passage of a chain to be lubricated, wherein the right side wicking pad is held in a right side pad holder, and the left side wicking pad is held in a left side pad holder, wherein the right side pad holder and the left side pad holder each bear a retainer feature to releasably secure a lubricant wicking pad;
    a collar on the housing for releasable connection to a lubricant container; and
    a valve in the housing to regulate lubricant flow to the bottom wicking pad.

2. The apparatus of claim 1 wherein the bottom wicking pad is held in a bottom pad holder bearing an orifice for passage of lubricant.

3. The apparatus of claim 1 wherein the retainer feature comprises serrated teeth.

4. The apparatus of claim 1 wherein the bottom wicking pad is held in place by the right side wicking pad and left side wicking pad.

5. The apparatus of claim 1 further including a cap for releasable connection to the housing.

6. A chain lubricant applicator apparatus comprising:
    a lubricant container;
    a housing releasably connected to the lubricant container, the housing carrying a bottom wicking pad, right side wicking pad, and left side wicking pad, together defining a channel for passage of a chain to be lubricated, wherein the right side wicking pad is held in a right side pad holder, and the left side wicking pad is held in a left side pad holder, wherein the right side pad holder and the left side pad holder each bear a retainer feature to releasably secure a lubricant wicking pad; and
    a valve in the housing to regulate lubricant flow from the lubricant container to the bottom wicking pad.

7. The apparatus of claim 6 wherein the bottom wicking pad is held in a bottom pad holder bearing an orifice for passage of lubricant.

8. The apparatus of claim 6 wherein the retainer feature comprises serrated teeth.

9. The apparatus of claim 6 wherein the bottom wicking pad is held in place by the right side wicking pad and left side wicking pad.

10. The apparatus of claim 6 further including a cap for releasable connection to the housing.

11. The apparatus of claim 6 wherein the lubricant container includes a dispensing tip.

* * * * *